Figure 1:
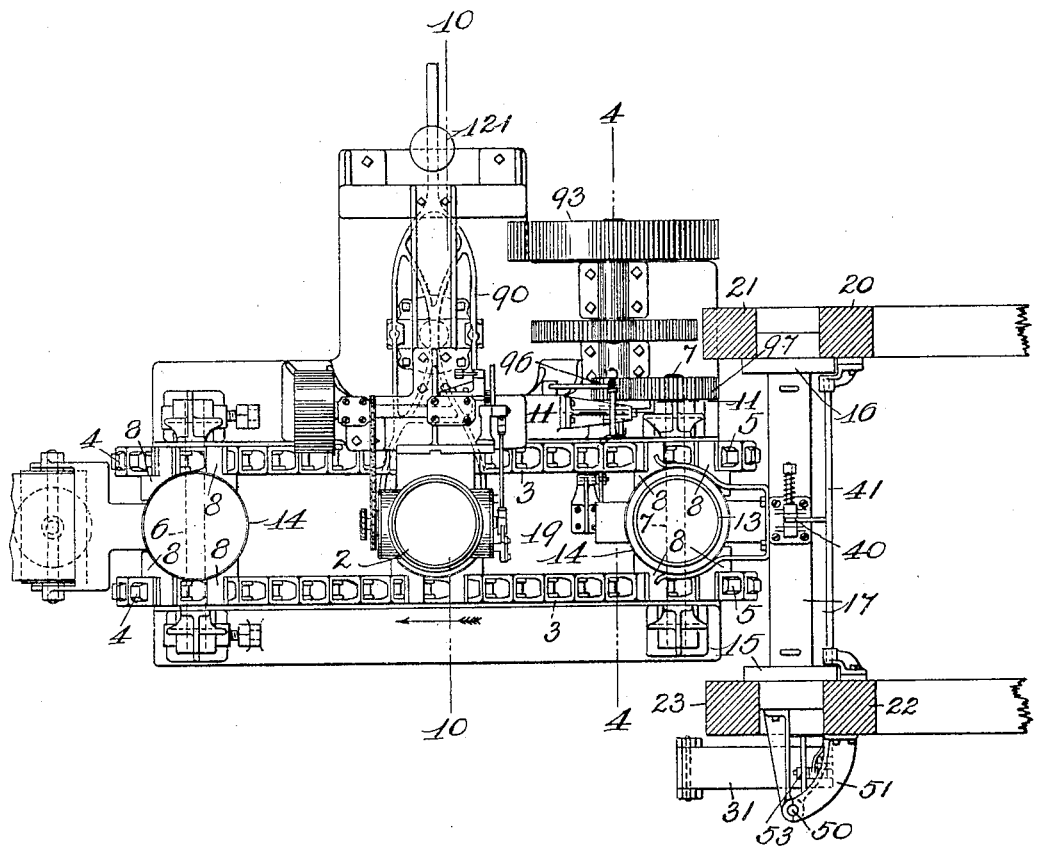

No. 804,262. PATENTED NOV. 14, 1905.
F. G. PENNOCK.
BAG FILLING AND WEIGHING MACHINE.
APPLICATION FILED APR. 8, 1904.

11 SHEETS—SHEET 1.

WITNESSES:
Louis A. Jones.
Sydney E. Taft.

INVENTOR
Frederick G. Pennock
by Wm A. Copeland
attorney

No. 804,262. PATENTED NOV. 14, 1905.
F. G. PENNOCK.
BAG FILLING AND WEIGHING MACHINE.
APPLICATION FILED APR. 8, 1904.

11 SHEETS—SHEET 2.

WITNESSES:
Louis H. James.
Sydney E. Taft.

INVENTOR:
Frederick G. Pennock
by Wm A. Copeland
attorney

No. 804,262. PATENTED NOV. 14, 1905.
F. G. PENNOCK.
BAG FILLING AND WEIGHING MACHINE.
APPLICATION FILED APR. 8, 1904.

11 SHEETS—SHEET 4.

No. 804,262. PATENTED NOV. 14, 1905.
F. G. PENNOCK.
BAG FILLING AND WEIGHING MACHINE.
APPLICATION FILED APR. 8, 1904.
11 SHEETS—SHEET 5.
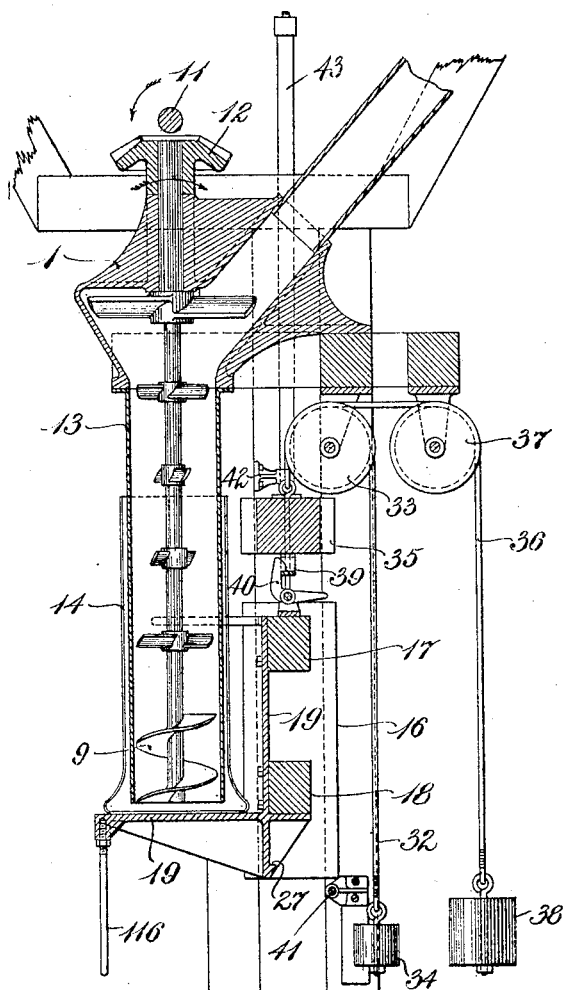
FIG. 5.
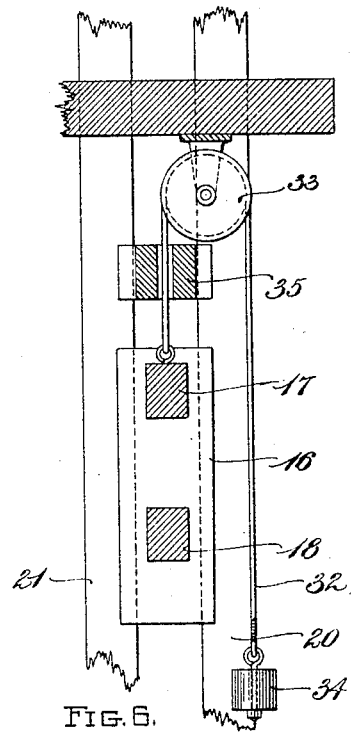
FIG. 6.
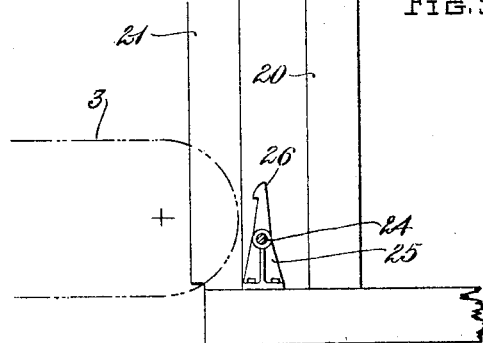
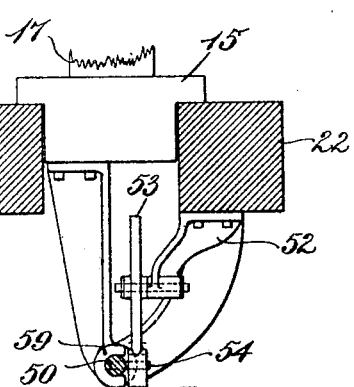
FIG. 7.
WITNESSES:
Louis H. Jones.
Sydney E. Taft.
INVENTOR:
Frederick G. Pennock
by Wm. A. Copeland
attorney.

No. 804,262.

PATENTED NOV. 14, 1905.

F. G. PENNOCK.
BAG FILLING AND WEIGHING MACHINE.
APPLICATION FILED APR. 8, 1904.

11 SHEETS—SHEET 6.

WITNESSES:
Louis H. Jones.
Sydney E. Taft.

INVENTOR:
Frederick G. Pennock
by Wm. A. Copeland,
Attorney.

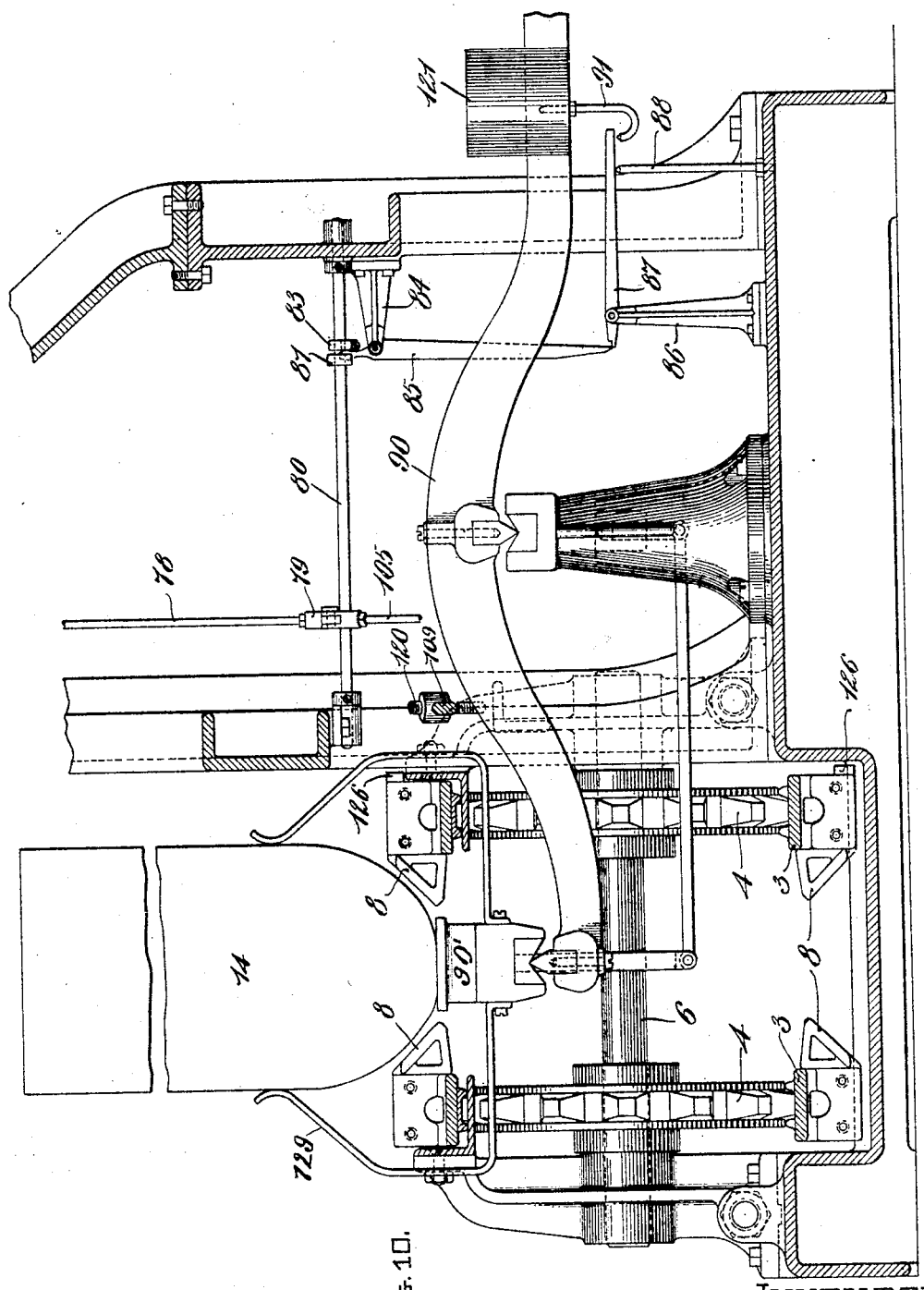

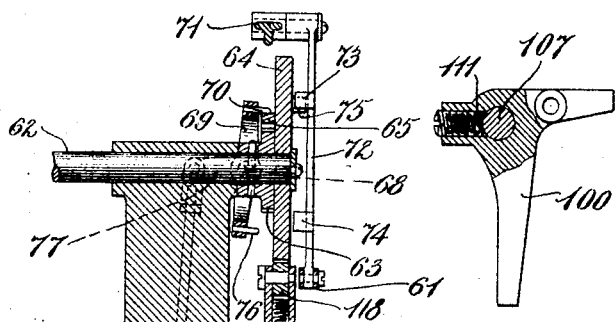
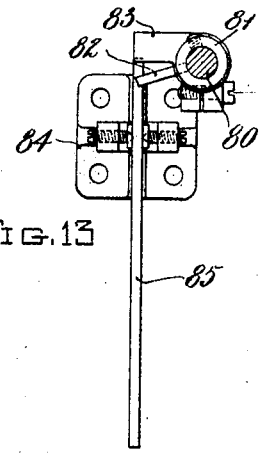
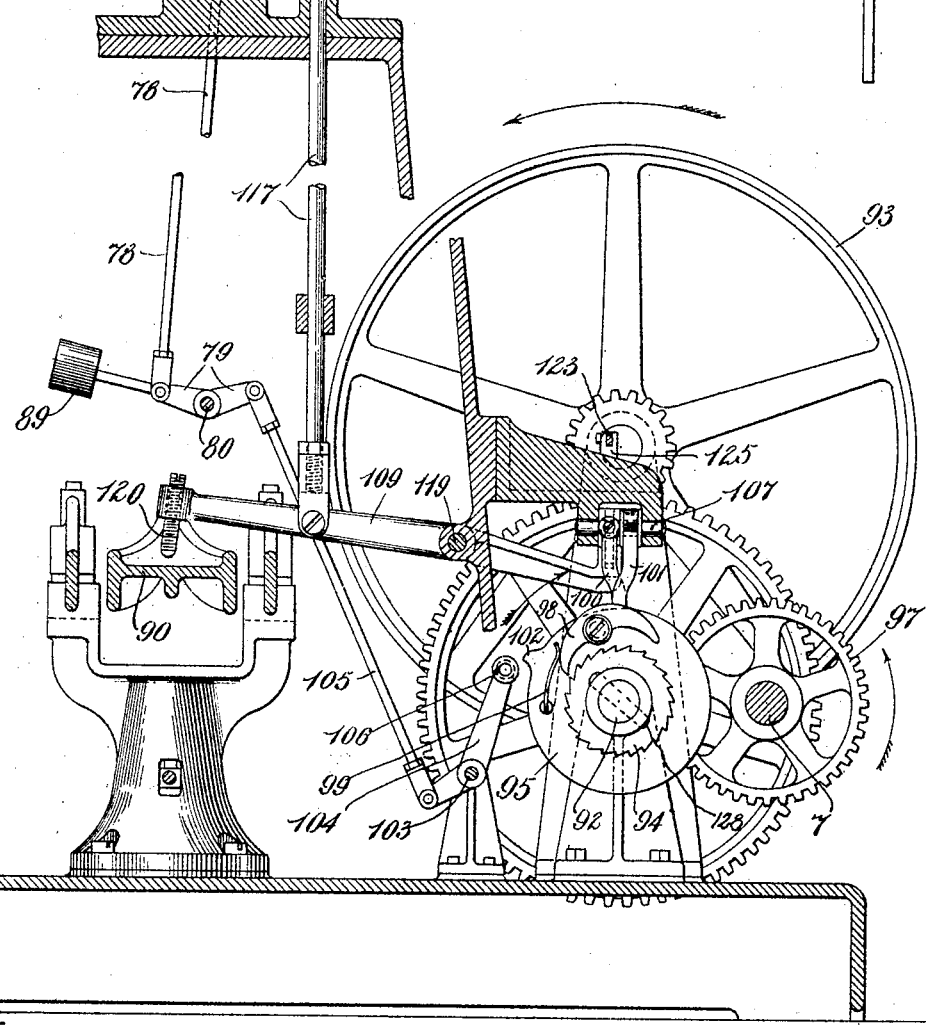

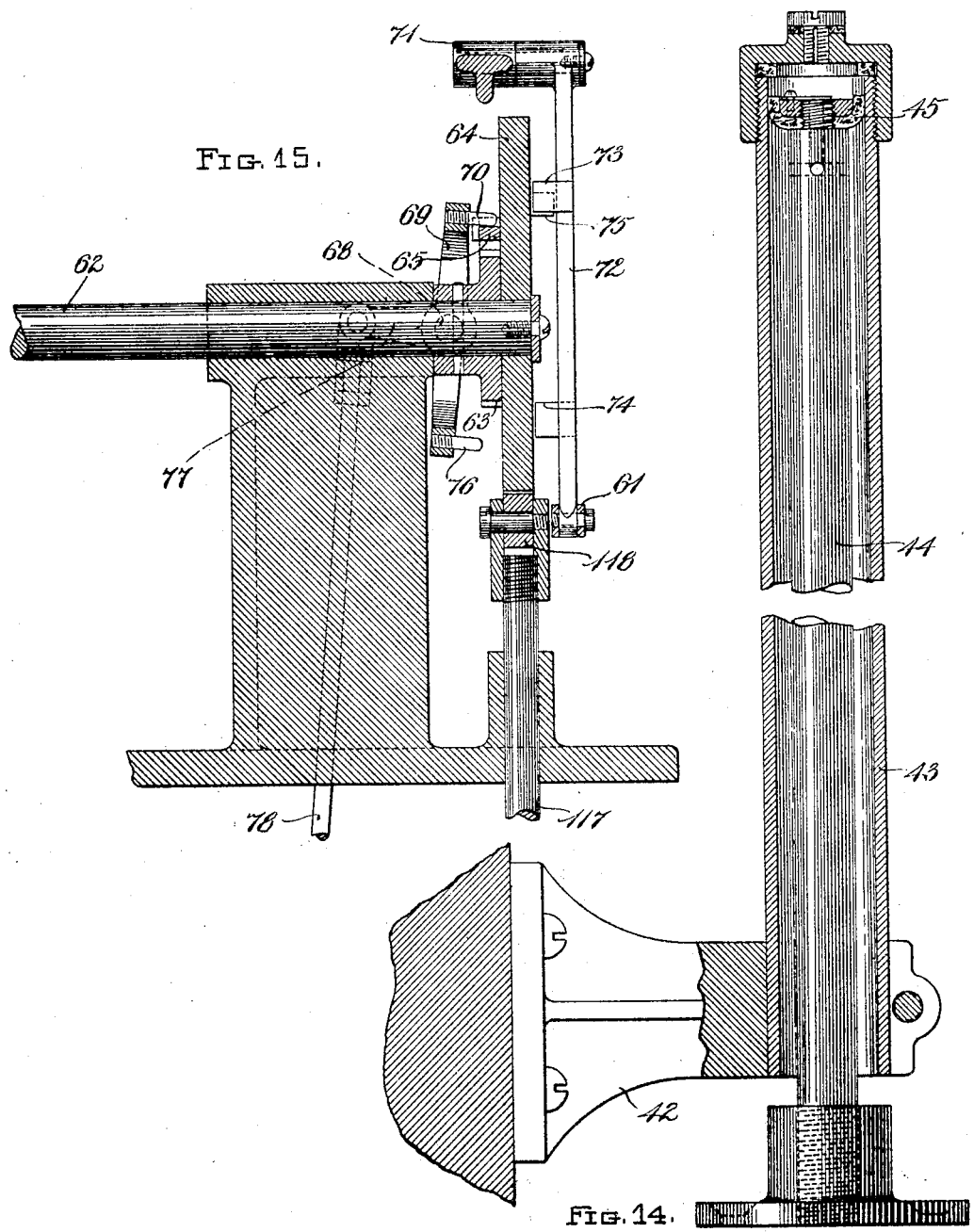

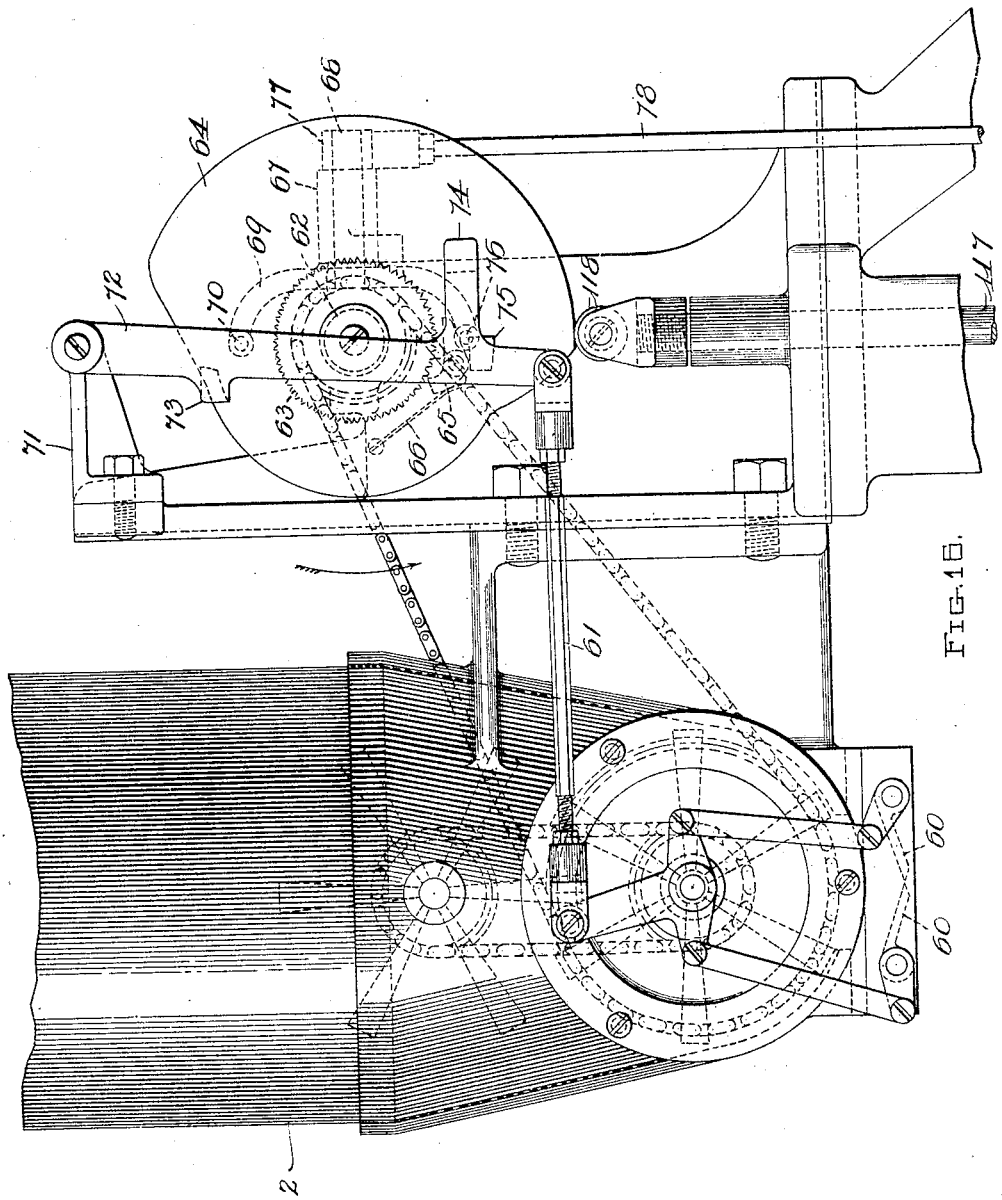

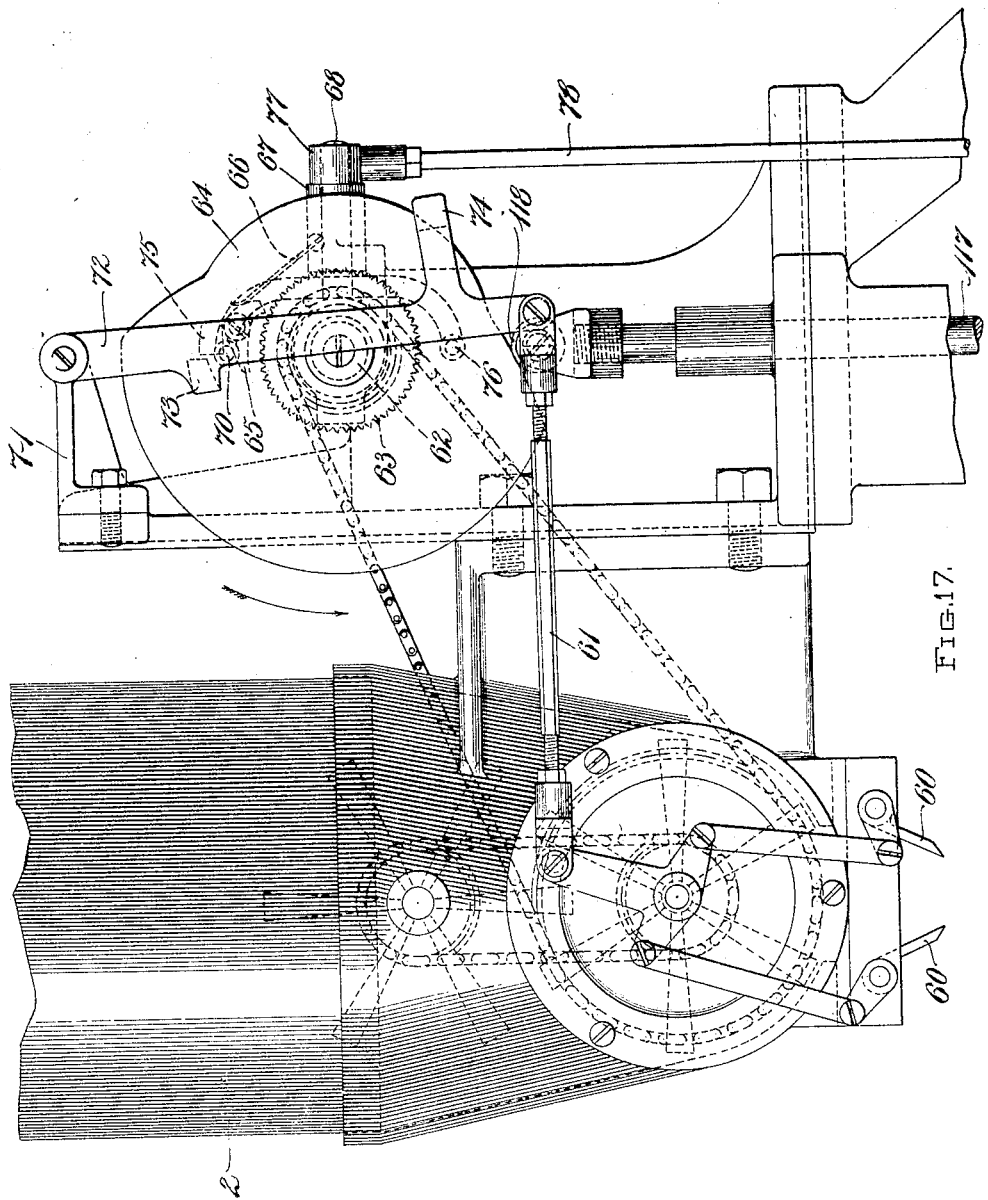

UNITED STATES PATENT OFFICE.

FREDERICK G. PENNOCK, OF BRAINTREE, MASSACHUSETTS, ASSIGNOR, BY MESNE ASSIGNMENTS, TO PNEUMATIC SCALE CORPORATION LIMITED, A CORPORATION OF MAINE.

BAG FILLING AND WEIGHING MACHINE.

No. 804,262.     Specification of Letters Patent.     Patented Nov. 14, 1905.

Application filed April 8, 1904. Serial No. 202,168.

*To all whom it may concern:*

Be it known that I, FREDERICK G. PENNOCK, of Braintree, in the county of Norfolk and State of Massachusetts, have invented certain new and useful Improvements in Bag Filling and Weighing Machines, of which the following is a specification.

The invention is specially intended for use in machines for weighing and filling bags in which the bag is partially filled through one feed-hopper or supply and is then transferred to the scale-pan, where it receives the remainder of its load while another bag is placed in position and is receiving its preliminary supply.

In double-hopper machines for filling cartons or cans the cartons or cans are usually pushed along on a track to and from the scale-pan, which is on the same level with the track, the scale-pan ocupying a cut-out section in the track and free to tip without coming in contact with the sides of the track. When the receptacles to be filled are bags, the friction of the bottom of the bag on the track causes the bag to drag or to be thrown out of an upright position, and it is found best to have a traveling carrier or conveyer which supports the bottom of the bag instead of pushing the bag along on a fixed track. When a conveyer of this character is used, it is important that when the partially-filled bag is brought to the scale-pan the scale-pan should be caused to rise and lift the bag out of contact with the conveyer, thus leaving the bag free from the conveyer during the weighing operation, and that when the scale-pan drops under the weight of the completed load the bag shall be again deposited on the conveyer. One object of the invention is to provide means for accomplishing this result.

When the material to be weighed and packed is flour or plaster or other close goods, the preferred form of feed for the preliminary supply is a worm-feed, and when such form of feed is used it is preferable to have the bag supported on a vertically-movable support which descends under the pressure of the worm in feeding the material, and it is also important to have a yielding upward pressure on the bottom of the support to partially resist the downward pressure of the worm, and thereby pack the material more compactly. It is also important that the conveyer should not begin to move until both feeds are shut off. One feature of the present invention relates to mechanism for doing this.

Another feature of the invention relates to the means by which the scale-feed is opened by the movement of the conveyer just before the conveyer comes to a rest and is closed by the tipping of the scale-beam after the bag has received its full weight.

In weighing-machines as usually made, in which the scale-feed is closed by the tipping of the scale-beam, the closing movement is actuated by the tail of the scale-beam when it is tipped by the load on the scale. It is important, however, for accuracy of weighing that the tail of the scale-beam should be required to exert as little energy as possible and that the closing of the feed should take place as soon as possible after the tipping of the scale.

One object of the present invention is to improve on the means heretofore used.

Other features of the invention will be set forth hereinafter.

In the machine shown the preliminary feed device is a screw or worm-feed inclosed in a funnel into which the material is fed through a hopper. The bag is slipped over the funnel by the operator by hand. A vertically-movable support for the bottom of the bag, which is termed the "elevator," is controlled by the operator. A latch holds the elevator in its lowermost position until released by the operator. After a bag has been placed outside of the funnel if the operator is ready to start the machine he presses a treadle and releases the elevator, which is carried up by means of a weight attached to a cord running up over a pulley. The frame of the elevator is carried up alongside of the funnel on which the bag is placed and has on its lower end an angle-plate which extends under the funnel. When the elevator has reached its uppermost position, this plate has come up against the bottom of the bag to support the bag while being filled and during the descent of the elevator. When the elevator reaches its uppermost position, it latches onto a vertically-movable cross-head, which is normally held in its uppermost position by a weight which is connected with said cross-head by a cord running up over a pulley. The upward movement of the elevator actuates mechanism which brings the driven member of a clutch into engagement with the driving member, whereby the worm-shaft is operatively connected with the driving-shaft and starts the worm-feed. The downward pressure of the worm-feed causes the descent of the elevator. The movable cross-head, which is now connected with the elevator, is caused by its weight to exert an upward pressure on the bottom of the bag, but yields to the downward pressure of the worm. When the elevator and held bag have descended a certain distance, the movable cross-head is tripped from engagement with the elevator, allowing the weight which is connected with the cross-head to descend and carry up the cross-head to its uppermost position again. When the cross-head rises, it actuates mechanism which throws out of engagement the driven member of the clutch, which controls the movement of the worm-feed, and thereby stops the worm-feed. When the elevator reaches the lowermost position, it becomes latched in that position, and the partially-filled bag is in position where an intermittently-moving conveyer will remove it from the elevator as soon as the conveyer starts and transfer it to the scale, where it receives the remainder of its load.

The conveyer consists of two endless chains parallel with each other running over sprocket-wheels and having attached thereto blocks which form seats for the bag while being carried to the scale.

The sprockets carrying the conveyer-chains are driven intermittently by a shaft through a rachet-and-pawl connection, the pawl being tripped at the end of each revolution of the pawl-carrier, thus stopping the conveyer.

There are two independently-controlled movable stops which engage the pawl to hold it out of engagement with the ratchet and prevent the conveyer from moving until the proper time. One of these stops is released by the descent of the elevator carrying the partially-filled bag, and the other stop is released by mechanism actuated by the tipping of the scale-beam under the weight of the filled bag. The tipping of the scale-beam also actuates the cut-off for the scale-feed. When both stops are released, the pawl is thrown into connection with the ratchet, and the conveyer starts and moves until the pawl is tripped at the end of one revolution of the pawl-carrier. The scale-feed is opened and closed by a cut-off actuated by an intermittently-rotating pawl-carrier having a pawl which is adapted to engage with a rotating ratchet. When the pawl is in engagement with the ratchet, the pawl-carrier rotates. There are two movable stops, which are alternately thrown into position to trip the pawl and stop the pawl-carrier. One of these stops is released by the tipping of the scale-beam, allowing the pawl-carrier to rotate and actuate the shut-off for the scale-feed. The said stops are carried by a rocking lever in such manner that when one stop is released from the pawl the other is moved into position to trip the pawl and stop the pawl-carrier when the pawl-carrier has rotated a certain distance. The stop which is thrown into engaging position by the tipping of the scale-beam is subsequently released by the rocking lever being turned by mechanism actuated by movement of the conveyer, thereby allowing the pawl-carrier to rotate and actuate the mechanism which opens the scale-feed. The movement of the pawl-carrier which closes the scale-feed actuates mechanism which holds down the forward arm of the scale-beam until the partially-filled bag on the conveyer reaches a position above the scale-pan. When the conveyer stops with a partially-filled bag above the scale-pan, the detent is released from the scale-beam and the scale-pan is moved up through an opening in the conveyer or between the chains of the conveyer and lifts the bag up from the conveyer, holding it up free from the conveyer until the scale-beam is tipped by the predetermined weight of the filled bag. When the scale-beam is thus tipped, the scale-pan descends far enough for the bag to again be deposited on the seats on the conveyer, and when the conveyer again starts the filled bag is removed and another partially-filled bag is brought to the scale-pan.

The invention will now be fully described, reference being made to the accompanying drawings, and the novel features thereof will be particularly pointed out in the claims at the close of the specification.

Figure 2:
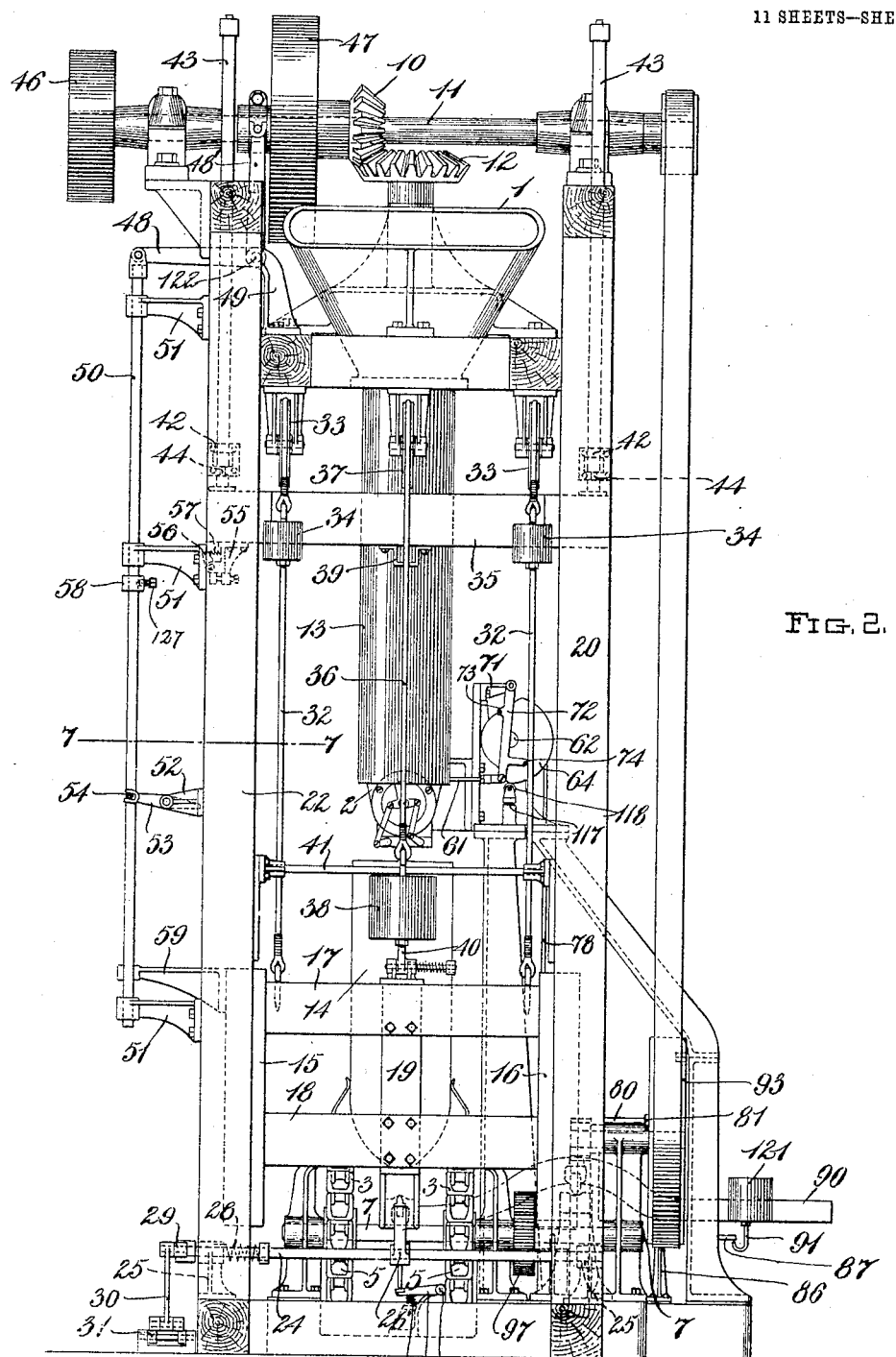
Figure 3:
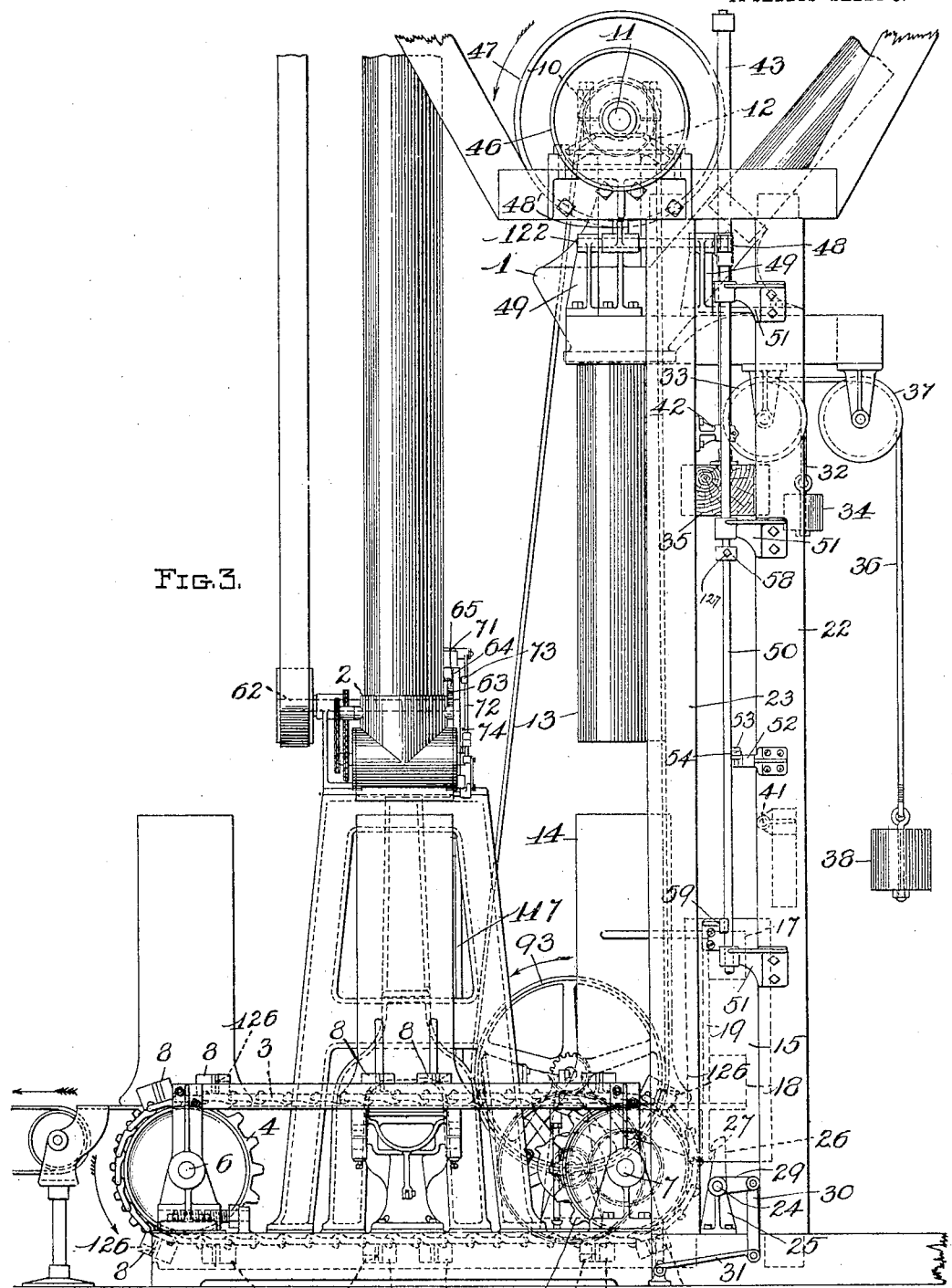
Figure 4:
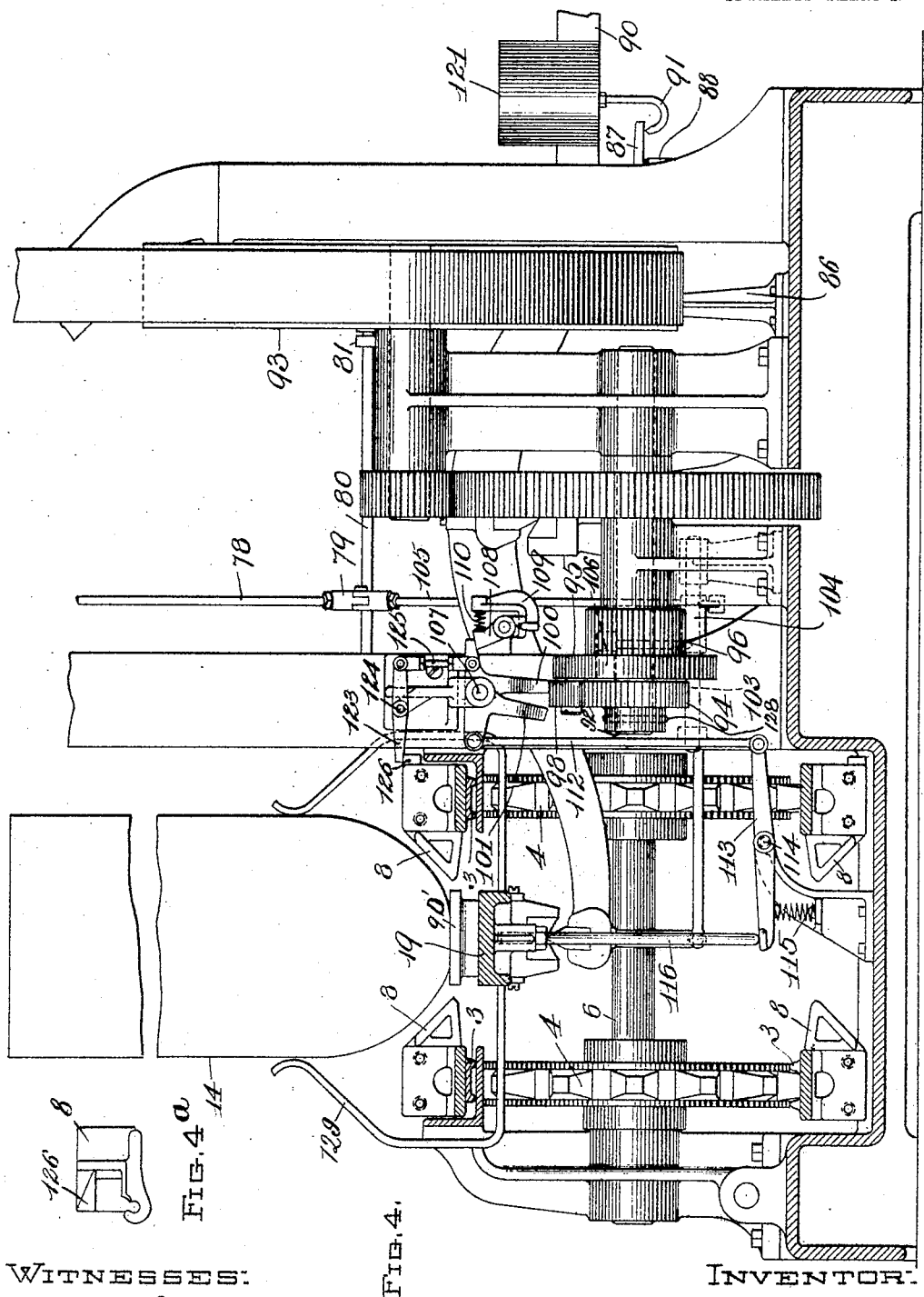
Figure 8:
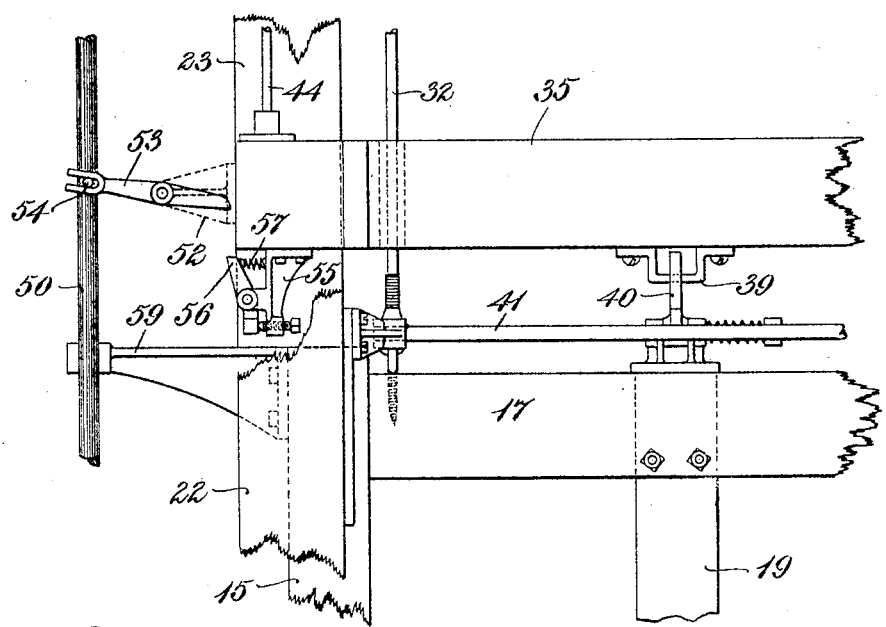
Figure 9:
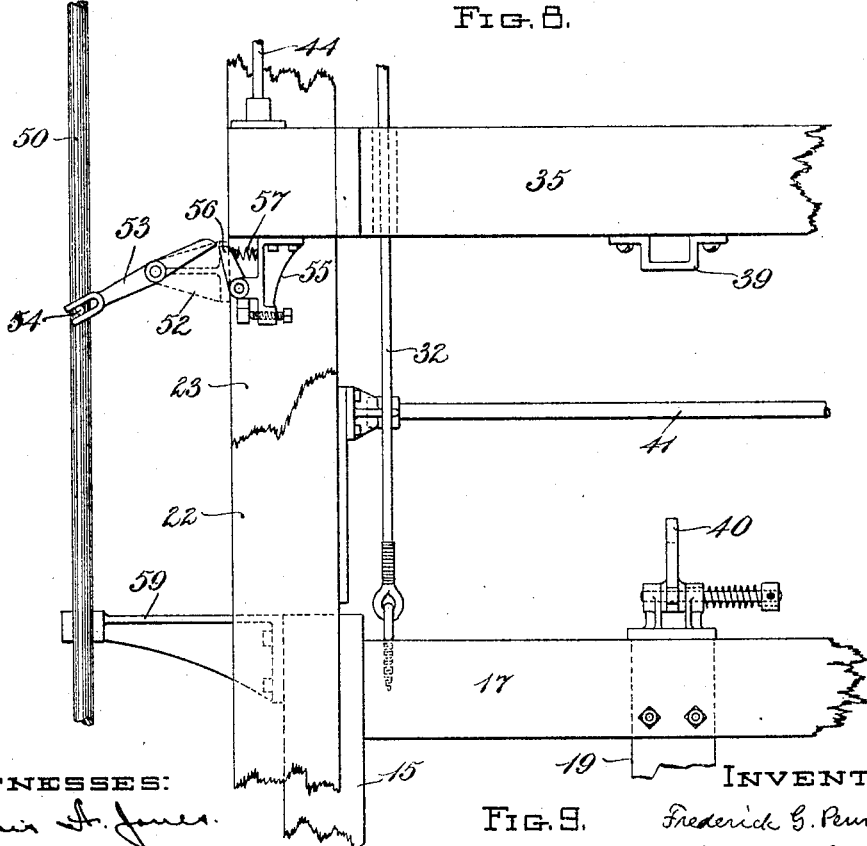

In the drawings, Figure 1 is a plan, partly in section, of a machine embodying the invention. Fig. 2 is a side elevation viewed from the right hand of Fig. 1. Fig. 3 is a front elevation. Fig. 4 is an enlarged elevation, partly in section, on line 4 4 of Fig. 1 looking to the left. Fig. 4$^a$ is a detail view of one of the blocks on the conveyer. Fig. 5 is a vertical section through the middle of the hopper and funnel shown in Fig. 2 looking to the right. Fig. 6 is a sectional detail of a part of Fig. 5, showing the counterweight for the elevator. Fig. 7 is a section on line 7 7 of Fig. 2. Fig. 8 is a part of Fig. 2 enlarged, the elevator in this view having partially descended, the catch which holds the weight that actuates pressure on the bottom of the bag during the filling being just about to be released. Fig. 9 is a view similar to Fig. 8, showing the position after the pressure-weight has been released from the elevator. Fig. 10 is a vertical section on line 10 10 of Fig. 1, enlarged, partly broken away and partly in full lines. Fig. 11 is a sectional detail, enlarged, on line 11 11 of Fig. 1. Fig. 12 is a detail of the pawl-stop, which is released by the tipping of the scale-beam to permit the conveyer to move. Fig. 13 is a detail of the mechanism for actuating the rock-shaft which closes the scale-feed when the scale-beam tips. Fig. 14 is a detail section, enlarged, of one of the piston-cylinders and its piston for cushioning the descent of the weight which gives the pressure to the bottom of the bag while being filled. Fig. 15 is a sectional detail showing the stop mechanism for stopping twice at each rotation the cam which actuates the opening and closing of the scale-feed—that is, stopping it when the feed opens and again when it closes. Figs. 16 and 17 are detail views showing the mechanism for opening and closing the scale-feed, Fig. 16 showing the feed closed and Fig. 17 showing it open.

Referring now to the drawings, 1 is the preliminary or screw feed hopper, and 2 is the scale or drip hopper, through which the final supply is furnished, and 3 is the traveling conveyer, by which the bags are transferred to and from the scale. (See Figs. 1, 2, 3, and 5.)

The conveyer consists of two endless chains 3 3, running over sprockets 4 4 and 5 5, mounted, respectively, on shafts 6 and 7, which revolve intermittently, as will be hereinafter described. (See Figs. 1, 2, 3, 4, and 10.)

Mounted on the links of the chains 3 3 are blocks 8, (see Figs. 1, 3, 4, and 10,) which are spaced at intervals equal to the distance between the preliminary and the scale feed positions of rest. These blocks have inclined inner faces to engage and support the bottom of the bag. Preferably there are fingers 129 attached to the scale-pan to support the sides of the bag.

The preliminary feed consists of a rotary worm 9, mounted on the hopper 1 and driven by bevel-gear 10 on shaft 11, engaging with bevel-gear 12 on the worm-shaft. (See Figs. 2, 3, and 5.)

Secured to the lower end of the hopper 1 is a funnel 13, which incloses the worm 9, outside of which the bag 14 is placed by the operator just after the partially-filled bag has been removed and before the worm is started in motion. (See Figs. 2, 3, and 5.)

The vertically-movable rest for the bag during the preliminary feeding will be referred to as the "elevator" and is brought up into engagement with the bottom of the bag after the bag has been placed on the funnel. (See Fig. 5.)

The elevator and operating mechanism are described as follows, (see Figs. 1, 2, 3, 5, 6, and 7:) The elevator, as shown, consists of two slide-bars 15 16, connected by cross-bars 17 18, and secured to said cross-bars is the angle-plate 19, which supports the bottom of the bag. The bars 15 16, which form the sides of the elevator, slide in ways formed by the upright supports 20 21 on one side and 22 23 on the other side, which also form a part of the frame. (See Figs. 2 and 7.) Until the bag has been placed upon the funnel the elevator is kept in its lowermost position, as shown in Figs. 2 and 3. The means for retaining it in this position are as follows: Mounted on a rock-shaft 24, which is supported in bearings 25 25, is a latch 26, which is held in engagement with a hook 27 on the elevator-plate 19 by a torsion-spring 28. (See Figs. 2, 3, and 5.) Fixed to the rock-shaft 24 is a lever 29, connected by a link 30 with a treadle 31, by pressing down upon which the operator can disengage the latch 26 from the hook 27 on the elevator-plate. (See Fig. 3.) Fastened to the elevator are ropes 32 32, which pass up over pulleys 33 33 and have attached at their free ends weights 34 34. (See Figs. 5 and 6.) These weights are enough heavier than the elevator to raise the elevator when the latch 26 is released if there is no load on the elevator. This brings the horizontal part of the plate 19 up against the bottom of the bag, as shown in Fig. 5. The operator will trip the latch to permit the elevator to rise just after he has placed the bag on the funnel. After the worm-feed starts the packing of the material into the bag causes the elevator and held bag to descend against a yielding upward pressure, as already mentioned. The mechanism for causing the upward yielding pressure is as follows: Slidable above the elevator in ways formed by the said uprights 20, 21, 22, and 23 is a cross-head 35, to which is fastened a rope 36, which passes over a pulley 37, the free end of the rope having attached thereto a weight 38. (See Figs. 2, 5, 8, 9.) On the bottom of the cross-head 35 is a loop 39, and pivoted on the top of the cross-bar 17 is a spring-controlled latch 40, which when the elevator is raised to its highest position engages with said loop. (See Figs. 2, 5, 8, and 9.) The downward pressure of the worm in feeding the material into the bag will cause the elevator to descend against the upward pressure caused by the weight 38; but the upward pressure will cause the material to be packed compactly in the bag. The weight 34 preferably overbalances the weight of the elevator just enough to carry up the elevator when empty, so as to carry it up easily, the upward pressure while the bag is being filled being caused mainly by the second weight 38.

Means are provided by which after the elevator has descended a sufficient distance for the bag to receive as much material as desired for the preliminary load the cross-head 35 shall be disengaged from the elevator. The means for doing this may be varied, but that shown is as follows: Secured to posts 20 22 is a cross-rod 41, which extends across the path of the tail of the latch 40. (See Figs. 2 and 5.) When the elevator rises, the tail of the latch rides over this rod and its spring immediately throws it back into position to engage the loop 39 at the top of its ascent. When the tail of the latch engages the said rod 41 in the descent of the elevator, the latch will be thrown out of engagement with the loop 39, and the weight 38 will then descend and raise the cross-head 35, while the weight of the material in the bag added to the weight of the elevator will overbalance the weight 34 and cause the elevator and held bag to complete their descent. The upward movement of the cross-head 35 causes the worm-feed to stop, as will be hereinafter described.

Means are provided to prevent the too rapid ascent of the cross-head 35 caused by the descent of the weight 38 and the vibration to the machine which would be occasioned thereby when the latch 40 is tripped. The means shown are as follows: Held by brackets 42 42, fastened to posts 20 22, are cylinders 43 43, in each of which slides a piston 45, carried by rod 44. (See Fig. 14.) The lower end of the piston-rods are attached to the cross-head 35.

The means for driving the worm intermittently is as follows, (see Fig. 2:) Shaft 11 is driven continuously, as by pulley 46. Bevel-gear 10 is loose on said shaft and is fastened to the hub of friction-clutch 47, one member of which is also loose on said shaft. The member of the clutch which is fixed to the shaft is actuated by a lever 48', fixed to rock-shaft 122, having its bearings in bracket 49. Fixed also on said rock-shaft 122 is a lever 48, connected with a slide-rod 50, which moves in bearings in brackets 51. Pivoted on a bracket 52, which is fast to the frame of the machine, is a lever 53, which has a forked end which engages with a pin 54, projecting from slide-rod 50. (See Figs. 3, 8, and 9.) Pivoted on a bracket 55, which is fast to the cross-head 35, is a dog 56, which is normally held by a spring 57 in a position to engage the lever 53 when the cross-head 35 moves up or down. In the downward movement when the dog engages the lever the dog is turned back on its pivot and rides past the lever without actuating the slide-rod. In Fig. 8 the cross-head is shown as having just passed below the lever and the spring 57 has thrown the dog 56 out again into its normal position. When the cross-head 35 rises after being tripped from the elevator, the dog engages the under side of lever 53 and turns it on its pivot, as shown in Fig. 9, thus moving slide-rod 50 downward, and thereby turning rock-shaft 122 and lever 48' and disengaging the clutch 47, so that the worm-feed 9 will cease to revolve. The lever 53 is so located that the dog 56 will engage it and disengage the clutch just after the cross-head is released from the elevator.

It is desired that the worm shall be started just after the elevator has moved up into position to support the bottom of the empty bag, which has just been placed on the funnel 13. This is accomplished by having the elevator actuate the mechanism which throws the two members of the clutch 47 into engagement with each other. The means shown for doing this is as follows: Fast to shaft 50, as by a set-screw 127, is a collar 58, and projecting from the elevator is an arm 59, which just before the elevator reaches its uppermost position engages the collar 58 and carries the slide-rod 50 upward sufficiently to turn the rock-shaft 122 enough to bring the two members of the clutch into engagement with each other.

The mechanism for opening and closing the scale-feed will now be described. (See Figs. 11, 15, 16, and 17.) The shutters 60, which control the flow of material from the hopper 2, are operated by a connecting-rod 61 through a system of levers. The shutters are operated so as to open when a bag is deposited on the scale-pan 90' and remain open until the scale-beam 90 tips, and are then closed by mechanism actuated by the tipping of the scale-beam and are again opened by the mechanism which actuates the carrier when another bag is placed on the scale-pan. This mechanism is described as follows: Mounted fast on the continuously-revolving shaft 62 is a ratchet 63. (See Figs. 11, 15, 16, and 17.) Mounted loosely on said shaft is a pawl-carrier 64, to the face of which is pivoted a pawl 65, whose toe is held by spring 66 in engagement with the ratchet when it is not held disengaged by one of the stops to be hereinafter described. When the pawl is engaged with the ratchet, the pawl-carrier revolves with the shaft. Means are provided by which the pawl 65 is engaged with the ratchet and disengaged twice during each revolution of the pawl-carrier, and mechanism is provided which is actuated by the pawl-carrier in its alternate movements to open and close the shutters. Mounted in bearings 67 is a rock-shaft 68, on which is fixed a lever 69, carrying at its opposite ends pawl stop-pins 70 and 76, which alternately engage the heel of the pawl 65 and trip the toe of the pawl from engagement with the ratchet and thereby cause the pawl-carrier to cease revolving. Pivoted at one end to a bracket 71 is a lever 72, whose other end is pivoted to connecting-rod 61. Projecting from lever 72 are lugs 73 74, which are engaged alternately by a lug 75, projecting from the face of the pawl-carrier 64. When lug 75 engages lug 74, it moves lever 72 and connecting-rod 61 to the right, as viewed in Figs. 16 and 17, and thereby opens the shutters 60. As the lug 75 moves around in a circular path, being carried by the pawl-carrier, it will ride out of engagement with the lug 74 after it has moved a certain distance, and by mechanism which will be hereinafter described the pawl-carrier will be brought to a rest before the lug 75 comes into engagement with lug 73. After it starts again, it engages with lug 73 and throws the lever 72 and connecting-rod 61 in a direction to close the shutters 60. When either of the stop-pins 70 or 76 is in engagement with the pawl 65, it will hold the pawl out of engagement with the ratchet 63, thus preventing the pawl-carrier from rotating until the rocking lever 69 is rocked by shaft 68 to disengage the said stop-pin from the pawl. When said lever is thus rocked to disengage one of the stop-pins, it will bring the other stop-pin into position to engage the pawl and throw it again into engagement with the ratchet as soon as the pawl-carrier has rotated far enough to bring the pawl around to the stop-pin.

The mechanism by which the rocking lever 69 is operated is actuated by the movement of the pawl-carrier to throw the lever 69 in the direction which causes the shutters 60 to open, and is actuated by the tipping of the scale-beam 90 to throw the lever 69 in a direction to cause the shutters 60 to close.

The mechanism by which the lever 69 is actuated by the tipping of the scale-beam 90 to close the shutters will now be described. Pinned to rock-shaft 68 is a lever 77, whose end is connected with one end of rod 78, (see Figs. 11, 16, and 17,) the other end of said rod being connected with lever 79, fixed to rock-shaft 80. Fast to rock-shaft 80 is a collar 81, having a pin 82 projecting therefrom. Fast to said shaft 80 is a locking-lever 83. (See Fig. 13.) Fulcrumed in a bracket 84 is a vertical tripping-lever 85, whose upper end has a tapering head, which is engaged by locking-lever 83. Fulcrumed in a support 86 is a horizontal tripping-lever 87, whose tail overbalances its head and rests on stop 88. The lower end of the vertical lever 85 is normally held in delicate engagement with the end of the head of said horizontal lever 87 by the engagement of lever 83 with the inclined head of said lever 85. A weight 89 on lever 79 or some equivalent device tends to pull rod 78 down and hold the rock-shaft 80 so that the locking-lever 83 will bear against the head of vertical lever 85, and thereby press the lower end of said lever against the end of vertical lever 87. While the tripping-levers 85 and 87 are thus engaged, the head of the lever 85 bearing against the lever 83 prevents the downward pressure of the weight 89 from rocking the shaft 80. When the said parts are in the locking position, as shown in Fig. 10, the shutters for the scale-valve are open and the pawl-carrier and connections are as shown in Fig. 17. When the scale-beam 90 tips under the weight of the filled bag, a hook 91, depending from the tail of the scale-beam, is carried up into engagement with the lever 87 and trips the head of said lever 87 from engagement with the lower end of vertical lever 85, and rock-shaft 80 is allowed to turn under pressure of the weight 89 and pull down rod 78, thereby turning rock-shaft 68 and disengaging stop-pin 70 from pawl 65. This allows pawl 65 to engage with ratchet 63 and cause the pawl-carrier to turn and close the shutters 60 by the mechanism already described. The turning of lever 69 will bring stop-pin 76 into position to disengage the pawl from the ratchet when the pawl-carrier 64 shall have turned far enough to bring the pawl around to it in the manner already described.

The mechanism which actuates the bag-conveyer actuates the mechanism for opening the shutters for the scale-feed. The means by which this is done will now be described. Shaft 7, which drives the sprockets that carry the bag-conveyer, has an intermittent movement, as already stated. The means by which this intermittent movement is produced is as follows: Shaft 92 is driven by pulley 93 through intermediate gearing. Mounted fast on said shaft 92, as by a pin 128, is a ratchet 94. Mounted loosely on said shaft 92 is a pawl-carrier 95. Fixed to the back of pawl-carrier 95 is a spur-gear 96, which is also loose on shaft 92 and meshes with gear 97, which is fast to the sprocket-shaft 7. (See Fig. 1.) Pivoted to the face of pawl-carrier 95 is a pawl 98, on which presses a spring 99, tending to throw it into engagement with the ratchet when the pawl is not held disengaged by the stops 100 and 101, said stop 100 being controlled by the scale-beam and said stop 101 being controlled by the elevator. These stops are so positioned as to disengage the pawl 98 from the ratchet at the end of each rotation of the pawl-carrier. Projecting from pawl-carrier 95 is a tooth 102. Fulcrumed at 103 is a bell-crank lever 104, connected at one end with rod 105 and carrying at its other end a roll 106, which at certain times is adapted to engage with said tooth 102. Rod 105 is connected with bell-crank 79 on shaft 80.

In Fig. 11 the parts are in the position that they occupy when the bag is being filled. When the scale-beam tips, rock-shaft 80 is turned in the manner already described and through the connecting mechanism turns bell-crank 104 to bring roll 106 into the path of the tooth 102 ready to be acted upon by tooth 102 near the end of the revolution of the pawl-carrier after the pawl-carrier starts. As the termination of the filling operation of both feeds is independent of each other, it is necessary that means should be provided by which the bag-conveyer cannot start until both feeds have stopped.

The means by which the tipping of the scale and the downward movement of the elevator jointly control the starting of the conveying mechanism will now be described. Stop 100 consists of a bell-crank fulcrumed on a shaft 107, one arm of which normally projects down into the path of pawl 98 and the other arm of which is adapted to be engaged by a dog 108, pivoted on lever 109. (See Figs. 4 and 11.) Lever 109 is fulcrumed at 119. A spring 110 normally holds said dog in the path of said lever 100. In order to prevent the stop-lever 100 from swinging back by its own weight into position to intercept the pawl 98, a friction-washer 111 is provided, as shown in Fig. 12. Stop-lever 101 is also fulcrumed on shaft 107. The horizontal arm of stop-lever 101 is pivoted to one end of a connecting-rod 112, the other end of which is pivoted to a rocking lever 113, fulcrumed at 114. A spring 115 presses up against the lever 113 and normally holds the stop 101 in position to engage the pawl 98. Attached to the bottom of elevator-plate 19 is an adjustable rod 116, which when the elevator is in its lowermost position bears down on rocking lever 113 and holds the stop 101 out of engaging position for the pawl, as shown in Fig. 4. Pivoted to lever 109 (see Fig. 11) is a rod 117, which passes through suitable bearings and has on its upper end a roll 118, which engages the pawl-carrier 64. (See Figs. 3, 11, 15, 16, and 17.) The rim of pawl-carrier 64 forms a cam which actuates rod 117 downwardly. One end of lever 109 projects over the scale-beam 90 and has an adjustable stop 120, (see Figs. 10 and 11,) which when the said rod 117 moves into its lowermost position engages the forward arm of the scale-beam and moves it down, so that the filled bag which is on the scale 90' will drop down onto the blocks 8 8 on the conveyer in order that when the conveyer starts the bag will be carried by it. The said stop 120 also acts as a lock to hold the scale-beam down until another bag is brought to the scale-pan by the movement of the conveyer. In Fig. 16 the pawl-carrier 64 is shown in the position where the rod 117 is held down in its lowermost position, the shutters 60 being closed. It remains in this position until the pawl-carrier 64 is started again by the engagement of tooth 102 on pawl-carrier 95 (see Fig. 11) with the roll 106 on lever 104 just before the bag-conveyer stops.

The operation of the machine is as follows: Assume that a bag has been placed upon the funnel 13, as shown in Fig. 5, and the elevator raised by the operator pressing the treadle 31. Assume also that there is a partially-filled bag on the scale-pan 90' and the scale-beam 90 is unlocked. The weight 121 on the tail end of the scale-beam is sufficient to overbalance the partially-filled bag and has lifted the front end of the scale-beam to raise the bag off from the blocks 8. The shutters 60 of the scale-feed are open, as shown in Fig. 17. Near the end of the upward movement of the elevator the arm 59 engages collar 58 on rod 50 (see Fig. 2) and moves rod 50 upward and throws the two members of clutch 17 into engagement with each other, thus starting the worm 9. The upward movement of the elevator will also have latched the elevator to the cross-head 35 and have brought the plate 19 into engagement with the bottom of the bag. The packing of the material into the bag by the worm and the consequent descent of the elevator and the detaching of the cross-head 35 from the elevator will take place in the manner already described. When the elevator reaches the bottom of its descent, it is in the position shown in Fig. 3, the horizontal arm of the elevator-plate 19 having passed down between the chains 3 3 of the conveyer far enough for the bag to be in such position that when the conveyer starts the bag will be engaged by the blocks 88 and carry the bag off from the plate 19. At the end of the descent of the elevator the rod 116 will have rocked lever 113, as shown in Fig. 4, and released stop-lever 101 from the pawl 98, so that pawl 98 will engage with ratchet 94 as soon as stop-lever 100 is released from the pawl through the action of the scale-beam. In Fig. 4 the stop-lever 100 is still in engagement with the pawl 98, the scale-beam not yet having been tipped. When the bag on the scale-pan has received the completion of its load and the scale-beam tips, trip-lever 85 is released and rock-shaft 80 will turn, thereby drawing down rod 78 and turning lever 69 from the position shown in Fig. 11, releasing pin 70 from pawl 65, allowing pawl-carrier 64 to revolve and close the shutters 60, and throwing pin 76 into position to engage pawl 65 as soon as the pawl-carrier has in its rotation brought the pawl around to said pin 76. Fig. 17 shows the position of the pawl-carrier 64 just before the movement just described begins. During this movement of the pawl-carrier the cam action of the pawl-carrier will push down rod 117 and rock the lever 109 on its fulcrum and release the stop-lever 100 from pawl 98 and at the same time will lock the scale-beam. Both stop-levers 100 and 101 now being released from pawl 98, said pawl will be thrown by its spring 99 into engagement with ratchet 94, thus causing pawl-carrier 95 to start, and through the spur-gear 96, which is carried by said pawl-carrier, will cause sprocket-shaft 7 also to revolve and move the bag-conveyer. The gearing is so arranged as to move the bag-conveyer at each period of movement just far enough to always bring a pair of blocks 8 of the conveyer under each feed-chute. Stop-lever 100 should be thrown back into position to engage pawl 98 at the end of each revolution. The means shown are as follows: The horizontal arm of lever 100 is connected by a link 125 to one end of a lever 123, which is fulcrumed on stud 124. The blocks 8 on the conveyer are each formed with a lug having an inclined surface 126, which during the movement of the conveyer engages one end of lever 123 and pushes it up, thereby turning the stop-lever 100 back into position to intercept pawl 98 and throw it out of engagement with the ratchet 94 at the end of one revolution. (See Figs. 4 and 4$^a$.) Just before the pawl-carrier 95 completes its revolution the tooth 102 will engage roll 106 on lever 104 and through the connecting mechanism will turn rock-shaft 80 in the manner previously described and turn up the pin 82, which by its engagement with the head of lever 85 throws lever 85 back into position to engage the end of lever 87, as shown in Figs. 10 and 13. The turning of the rock-shaft 80, just described, will also move rod 78 upward and turn lever 69 to bring pin 76 out of engagement with pawl 65, allowing pawl-carrier 64 to turn and open shutters 60 in the manner already described. Pin 70 will be thrown into position to engage pawl 65 and stop the pawl-carrier, also as described. During the partial revolution of the pawl-carrier just described the point of the cam on the pawl-carrier will ride past the roll 118, and the weight 121 on the tail of the scale-beam will tip up the forward end of the scale-beam and rock the lever 109 into the position shown in Fig. 11, and thereby raise the rod 117, as permitted by the drop in the cam edge of the pawl-carrier 64, keeping the roll 118 in constant contact with the pawl-carrier. When the lever 109 is thrown up into the position shown in Fig. 11 by the tipping of the scale-beam under weight 121, the dog 108 will ride down past the horizontal arm of stop-lever 100 and by means of its spring 110 will be latched under said stop-lever 100, as shown in Fig. 4.

What I claim is—

1. In a bag filling and weighing machine, a scale having a pan, means by which the bag is partially filled before it is placed on the scale-pan, means by which it receives the completion of its load while on the scale-pan, an intermittently-moving conveyer which transfers the partially-filled bag to a position above the scale-pan, means for intermittently driving the conveyer, means for depressing the scale-pan below the conveyer, and means controlled by the driving mechanism to raise the scale-pan into engagement with the bag and lift it from the conveyer at or near the end of the movement of the conveyer.

2. In a bag filling and weighing machine, a scale having a pan, means by which the bag is partially filled before it is placed on the scale-pan, means by which it receives the completion of its load while on the scale-pan, an intermittently-moving conveyer which transfers the partially-filled bag to the scale-pan, means by which the scale-pan is held below the path of the bag while the conveyer is in motion, means controlled by the driving mechanism of the conveyer to unlock the scale-pan when the bag reaches the scale-pan and means by which when the scale-pan is unlocked the scale-pan rises and lifts the partially-filled bag from the conveyer.

3. In a bag filling and weighing machine, a scale having a pan, means by which the bag is partially filled before it is placed on the scale-pan, means by which it receives the completion of its load while on the scale-pan, an intermittently-moving conveyer which transfers the partially-filled bag to a position over the scale-pan, an opening in the conveyer and means by which when the scale-pan is reached the scale-pan is moved up through the opening in the conveyer and lifts the partially-filled bag up from the conveyer.

4. In a bag filling and weighing machine, a scale having a pan, means by which the bag is partially filled before it is transferred to the scale-pan, means by which it receives the completion of its load while on the scale-pan, an intermittently-moving conveyer which transfers the partially-filled bag to a position over the scale-pan, a scale-lock by which the scale-pan is held below the path of the bag while the conveyer is in motion, means controlled by the driving mechanism to unlock the scale when the bag reaches a position over the scale-pan, an opening in the conveyer, means by which when the scale is unlocked the scale-pan will be moved up through the opening in the conveyer and lift the partially-filled bag from the conveyer, and means actuated by the tipping of the scale-beam under the weight of the completed load to close the scale-feed and again lock the scale.

5. In a bag filling and weighing machine, an intermittently-moving bag-conveyer, with an opening therein, driving mechanism, a tilting scale whose pan is movable up and down through the opening in the said conveyer, a scale-lock which is adapted to hold the scale-pan below the path of the bag, means controlled by the driving mechanism to release the lock when a bag is brought to a position above the scale-pan, a counterweight which when the lock is released tips the scale-beam so as to raise the pan and lift the bag off of the conveyer, said counterweight being overbalanced by the predetermined weight of the bag when filled, and means controlled by the tipping of the scale-beam under the weight of the filled bag to depress the scale-pan below the bag-conveyer and deposit the bag on the conveyer in the descent of the pan and apply the lock to the scale.

6. In a bag-filling machine, a traveling bag-conveyer comprising two endless travelers moving parallel with each other in the same direction and at equal speed, with a space between them, a series of blocks secured to each of said travelers opposite to each other, those on each traveler extending toward those on the other traveler, and having inclined faces which form a seat for the bag.

7. In a bag filling and weighing machine, a scale, two feed mechanisms one of which supplies to each bag a part of the required load and the other of which supplies it with the additional amount required while on the scale-pan, a traveling conveyer which moves the partially-filled bag to the scale-pan, said conveyer comprising two intermittently-moving endless travelers moving parallel with each other in the same direction and at equal speed with a space between them, said travelers both extending past the scale-pan, one in front and one in the rear, said scale-pan having a tilting movement through the space between said travelers, seats for the bag on said conveyer, means for normally holding the scale-pan below the path of the bag, means for tilting the scale-pan up and thereby lifting the partially-filled bag and holding it away from the conveyer during the operation of the scale-feed, the falling of the scale-pan under the weight of the filled bag causing the bag to be again deposited on the conveyer.

8. In a filling and weighing machine, a scale, a feed-chute which supplies material to the receptacle while on the scale, a shut-off valve for the outlet from the feed-chute, a rotating shaft, a ratchet fast to said shaft, a pawl-carrier loose on said shaft having a pawl adapted to engage with said ratchet whereby the pawl-carrier revolves when the pawl and ratchet are in engagement with each other, a rocking lever fulcrumed intermediate its ends and having on its opposite ends stops which are adapted to alternately engage with and trip said pawl and stop the pawl-carrier twice during each revolution, mechanism connected with the said shut-off valve which is actuated by the alternate movements of the pawl-carrier to alternately open and close the said valve, and mechanism actuated by the movement of the scale under the predetermined weight of material to trip the stop which controls the valve-closing movement of the pawl-carrier.

9. In a filling and weighing machine, a scale, a feed-chute which supplies material to the receptacle while on the scale, a shut-off valve for the outlet from the feed-chute, a rotating shaft, a ratchet fast to said shaft, a pawl-carrier loose on said shaft having a pawl adapted to engage with said ratchet whereby the pawl-carrier revolves when the pawl and ratchet are in engagement with each other, a rocking lever fulcrumed intermediate its ends and having on its opposite ends stops which are adapted to alternately engage with and trip said pawl, and stop the pawl-carrier twice during each revolution, mechanism connected with the said shut-off valve which is actuated by the alternate movements of the pawl-carrier to alternately open and close the said valve, a conveyer which carries the receptacles to the scale, mechanism for intermittently moving said conveyer, and mechanism actuated by said conveyer-driving mechanism to turn said rocking lever and trip the stop which controls the valve-opening movement of the pawl-carrier.

10. In a bag filling and weighing machine, a scale, two feed mechanisms one of which supplies to each bag a part of the required load and the other of which supplies it with the additional amount required while on the scale, an intermittently-moving conveyer which moves the partially-filled bag to the scale, said conveyer consisting of an endless traveler driven by an intermittently-driven shaft, a driving-shaft, a ratchet fixed to said driving-shaft, a pawl-carrier mounted loosely on said driving-shaft and operatively connected with said driven shaft, a pawl on said carrier adapted to engage with said ratchet and thereby cause the said driven shaft to rotate and the conveyer to move, two independently-controlled stops both of which are adapted to engage said pawl and thereby prevent the movement of said driven shaft and conveyer, a movable holder for the bag during the preliminary feed which stops said feed at a predetermined point in its movement, mechanism controlled by the movement of said holder after it has stopped the feed to throw one of said stops out of engagement with said pawl, and mechanism actuated by the movement of the scale under the weight of the filled bag to trip the other of said stops, the tripping of both of said stops being necessary to permit movement of the conveyer, and mechanism actuated by said pawl-carrier near the end of its movement to open the scale-feed.

11. In a filling and weighing machine, a scale, two feed mechanisms one of which supplies to each receptacle a part of the required load and the other of which supplies it with the additional amount required while on the scale, an intermittently-moving conveyer which moves the partially-filled receptacle to the scale, mechanism for intermittently moving said conveyer, two independently-controlled stops each of which is adapted to prevent movement of said conveyer, a movable holder for the receptacle while receiving the preliminary feed which transfers the partially-filled receptacle to said conveyer, mechanism actuated by the movement of said holder of the partially-filled receptacle to trip one of said stops, and mechanism actuated by the movement of the scale under the weight of the filled receptacle to trip the other one of said stops, the tripping of both of said stops being necessary before the conveyer can move.

12. In a filling and weighing machine, a scale, two feed mechanisms one of which supplies to each receptacle a part of the required load and the other of which supplies it with the additional amount required while on the scale, an intermittently-moving conveyer which moves the partially-filled receptacle to the scale, mechanism for intermittently moving said conveyer, two independently-controlled stops each of which is adapted to prevent movement of said conveyer, a movable holder for the receptacle while receiving the preliminary feed which transfers the partially-filled receptacle to said conveyer, mechanism actuated by the movement of said holder of the partially-filled receptacle to trip one of said stops, and mechanism actuated by the movement of the scale under the weight of the filled receptacle to trip the other one of said stops, the tripping of both of said stops being necessary before the conveyer can move, and mechanism actuated by the movement of the conveyer to move one of said stops into position to stop the conveyer after it has moved a certain distance.

13. In a filling and weighing machine, a scale, two feed mechanisms one of which supplies to each receptacle a part of the required load and the other of which supplies it with the additional amount required while on the scale, an intermittently-moving conveyer which transfers the partially-filled receptacle to a position over the scale-pan, a scale-lock by which the scale-pan is held below the path of the receptacle while the conveyer is in motion, a shut-off valve for the outlet from the feed-chute, a rotating shaft, a ratchet fast to said shaft, a pawl-carrier loose on said shaft having a pawl adapted to engage with said ratchet whereby the pawl-carrier revolves when the pawl and ratchet are in engagement with each other, mechanisms controlled alternately by the movement of the conveyer and by the movement of the scale to start said pawl-carrier and to stop it again twice during each revolution of the pawl-carrier, mechanism actuated by said pawl-carrier in that movement which is controlled by the moving of the conveyer to open the scale-feed, and which is actuated by the pawl-carrier in that movement which is controlled by the movement of the scale to close the scale-feed, and mechanism also actuated by that movement of the pawl-carrier which is controlled by the movement of the conveyer to apply the scale-lock.

14. In a filling and weighing machine, a scale, two feed mechanisms one of which supplies to each receptacle a part of the required load and the other of which supplies it with the additional amount required while on the scale, an intermittently-moving conveyer which transfers the partially-filled receptacle to a position over the scale-pan, a scale-lock by which the scale-pan is held below the path of the receptacle while the conveyer is in motion, a shut-off valve for the outlet from the feed-chute, a rotating shaft, a ratchet fast to said shaft, a pawl-carrier loose on said shaft having a pawl adapted to engage with said ratchet whereby the pawl-carrier revolves when the pawl and ratchet are in engagement with each other, mechanisms controlled alternately by the movement of the conveyer and by the movement of the scale to start said pawl-carrier and to stop it again twice during each revolution of the pawl-carrier, mechanism actuated by said pawl-carrier in that movement which is controlled by the moving of the conveyer to open the scale-feed, and which is actuated by the pawl-carrier in that movement which is controlled by the movement of the scale to close the scale-feed, mechanism also actuated by that movement of the pawl-carrier which is controlled by the movement of the conveyer to apply the scale-lock, and means for tipping up the forward arm of the scale-beam when the load is removed from the scale.

15. In a filling and weighing machine, a scale, a scale-feed, a rotating shaft, a ratchet fast to said shaft, a pawl-carrier loose on said shaft having a pawl adapted to engage with said ratchet and cause the pawl-carrier to revolve, means for tripping said pawl and stopping the pawl-carrier twice during each revolution, and mechanism actuated by the alternate movements of the pawl-carrier to alternately open and close the feed.

16. In a filling and weighing machine, a scale, a scale-feed, a rotating ratchet, a rotary pawl-carrier having a pawl adapted to engage with said ratchet, and thereby rotate the pawl-carrier, means for tripping said pawl and stopping the pawl-carrier twice during each revolution, mechanism actuated by alternate movements of the pawl-carrier to close the scale-feed and mechanism controlled by the movement of the scale to start the pawl-carrier and close the scale-feed.

17. In a filling and weighing machine, a scale, a scale-feed, an intermittently-moving receptacle-conveyer, a rotating ratchet, a rotary pawl-carrier having a pawl adapted to engage with said ratchet and thereby rotate the pawl-carrier, means for tripping said pawl and stopping the pawl-carrier twice during each revolution, mechanism actuated by alternate movements of the pawl-carrier to close the scale-feed, and mechanism controlled by the movement of the conveyer to start the pawl-carrier and open the scale-feed.

18. In a filling and weighing machine, a scale, a scale-feed, an intermittently-moving receptacle-conveyer, a rotating ratchet, a rotary pawl-carrier having a pawl adapted to engage with said ratchet and thereby rotate the pawl-carrier, means for tripping the pawl and stopping the pawl-carrier twice during each revolution, mechanism actuated by alternate movements of the pawl-carrier to alternately open and close the scale-feed, mechanism controlled by the movement of the conveyer to start the pawl-carrier and open the scale-feed, and mechanism controlled by the movement of the scale to start the pawl-carrier and close the scale-feed.

19. In a filling and weighing machine, a scale, a scale-feed, an intermittently-moving receptacle-conveyer, a rotating ratchet, a rotary pawl-carrier having a pawl adapted to engage with said ratchet and thereby rotate the pawl-carrier, means for tripping the pawl and stopping the pawl-carrier twice during each revolution, mechanism controlled alternately by the movement of the conveyer and by the movement of the scale to start the pawl-carrier, a scale-lock, and mechanism actuated by that movement of the pawl-carrier which is controlled by the conveyer to apply the scale-lock.

20. In a filling and weighing machine, a scale, a scale-feed, an intermittently-moving receptacle-conveyer, a rotating ratchet, a rotary pawl-carrier having a pawl adapted to engage with said ratchet and thereby rotate the pawl-carrier, means for tripping the pawl and stopping the pawl-carrier twice during each revolution, mechanism controlled by the movement of the conveyer to actuate each alternate movement of the pawl-carrier, mechanism actuated by the movement of the pawl-carrier which is controlled by the conveyer to open the scale-feed and mechanism also actuated by said movement of the pawl-carrier to hold the scale-beam from tipping.

21. In a filling and weighing machine, a scale, a scale-feed, a rotary disk, means for stopping and starting said disk twice during each rotation, and mechanism actuated by the alternate movements of the said disk to alternately open and close said feed.

22. In a filling and weighing machine, a scale, a scale-feed, a rotary disk, means for giving an intermittent rotary movement to said disk, and mechanism actuated by the alternate movements of said disk to alternately open and close said feed.

23. In a filling and weighing machine, a scale, a scale-feed, an intermittently-moving conveyer, a rotary disk, means for giving an intermittent rotary movement to said disk, and mechanism controlled alternately by the movement of the conveyer and by the tipping of the scale to open and close the scale-feed.

24. In a filling and weighing machine, a scale, a scale-feed, a rotary disk, means for giving an intermittent rotary movement to said disk, and mechanism actuated by the movement of said disk to close the scale-feed.

25. In a filling and weighing machine, a scale, a scale-feed, a rotary disk, means for giving an intermittent rotary movement to said disk controlled by the tipping of the scale-beam to start said disk, and means actuated by said disk when the scale-beam tips to close the scale-feed.

26. In a filling and weighing machine, a scale, a scale-feed, a rotating ratchet, a rotary pawl-carrier having a pawl adapted to engage with said ratchet and thereby rotate the pawl-carrier, mechanism controlled by the tipping of the scale-beam to trip said pawl and allow the pawl-carrier to rotate, and mechanism actuated by said pawl-carrier when the scale-beam tips to close the scale-feed.

27. In a filling and weighing machine, a scale, two feed mechanisms one of which supplies to each receptacle a part of the required load and the other of which supplies it with the additional amount required while on the scale, an intermittently-moving conveyer which moves the partially-filled receptacle to the scale, a rotating ratchet, a rotary pawl-carrier, mechanism actuated by said pawl-carrier to move the conveyer, a pawl on said carrier adapted to engage with said ratchet and thereby rotate the pawl-carrier and move the conveyer, two independently-controlled stops both of which are adapted to engage said pawl and thereby prevent movement of said pawl-carrier until after both feeds are stopped.

In testimony whereof I have affixed my signature in presence of two witnesses.

FREDERICK G. PENNOCK.

Witnesses:
WILLIAM A. COPELAND,
HARRY SMITH.